United States Patent [19]

Okuno

[11] Patent Number: 4,857,793
[45] Date of Patent: Aug. 15, 1989

[54] VIBRATION WAVE MOTOR
[75] Inventor: Takuo Okuno, Yokohama, Japan
[73] Assignee: Canon Kabushiki Kaisha, Tokyo, Japan
[21] Appl. No.: 87,708
[22] Filed: Aug. 21, 1987
[30] Foreign Application Priority Data
  Aug. 29, 1986 [JP] Japan ................... 61-202823
[51] Int. Cl.⁴ ............................ H01L 41/08
[52] U.S. Cl. ............................ 310/328; 310/328
[58] Field of Search ............. 310/317, 323, 328
[56] References Cited
  U.S. PATENT DOCUMENTS
  4,400,641  8/1983  Vishnevsky et al. ........... 310/323
  4,453,103  6/1984  Vishnevsky et al. ........... 310/323
  4,613,782  9/1986  Mori et al. .................... 310/323
  4,622,483 11/1986  Staufenberg, Jr. ............. 310/328
  4,678,956  7/1987  Izukawa ........................ 310/323

FOREIGN PATENT DOCUMENTS
  0614477  7/1978  U.S.S.R. ..................... 310/328

Primary Examiner—Mark O. Budd
Attorney, Agent, or Firm—Fitzpatrick, Cella, Harper & Scinto

[57] ABSTRACT

In a vibration wave motor, piezo-electric elements are provided in two orthogonal planes in the lengthwise direction of a bar-like vibration member and when a predetermined electric field is applied to these piezo-electric elements, rotational movement is generated in the surface of the vibration member in a plane perpendicular to the lengthwise direction of the vibration member, whereby a rotational member bearing against the vibration member is rotated and mechanical energy corresponding to supplied electric energy is taken out of the rotational member.

11 Claims, 4 Drawing Sheets

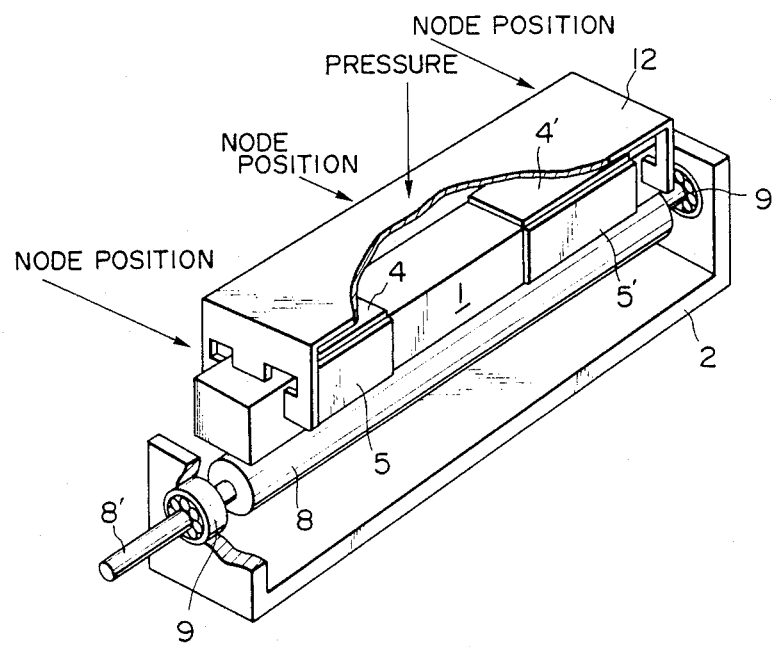
FIG. 8
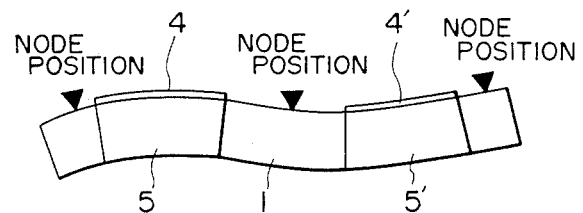

VIBRATION WAVE MOTOR

BACKGROUND OF THE INVENTION

1. Field of the Invention

This invention relates to an apparatus for obtaining rotational or linear driving energy from vibration energy, a so-called vibration drive motor, and in particular to a vibration drive motor utilizing the bending vibration of a bar-like vibration member in two directions.

2. Related Background Art

Most of the conventional motors utilize an electromagnetic force and they are comprised of iron cores, copper windings and permanent magnets and thus, require a great number of parts and accordingly a large size and increased weight of the motor.

To provide motors which eliminate these disadvantages, studies of a motors of new type utilizing ultrasonic wave vibration have been actively made in recent years. For example, as seen in Japanese Laid Open Patent Application No. 148682/1983, there is an apparatus in which a travelling vibration wave comprising a combined vertical wave and horizontal wave is generated in the surface of a vibration member and a moving member urged thereby is rotationally or linearly driven. This apparatus requires a small number of parts and is simple in construction, and thus leads to the provision of a relatively good motor. However, this apparatus, which uses a travelling vibration wave, unavoidably requires a circulating portion to be formed in the vibration member in order to cause the vibration wave to travel uninterruptedly, and is still insufficient to make the motor compact and light in weight. Further, according to this apparatus, a predetermined proportional relation is always kept between the amplitude of the vertical wave and the amplitude of the horizontal wave in principle and therefore, it is difficult to freely control the amplitude of the vertical wave which originally provides the drive force of the moving member and the amplitude of the horizontal wave which provides the supporting force of the moving member, and it is difficult to control the speed and drive force corresponding to a variation in the motor load.

There is also a vibration wave motor of the type as seen in Japanese Laid-Open Patent Application No. 62880/1985. This motor is basically such that a standing wave of vertical vibration is excited to thereby obtain a drive force. Now, generally, the wavelength of vertical vibration (vertical wave) has a value inherent to the material of the vibration member when the number of vibration is a predetermined value. The number of vibration of a vibration wave motor is usually of the order of 20–50 KHz to eliminate noise and from the limitations of vibration amplitude, etc. Accordingly, in the vibration wave motor of the above described type, assuming that the material of the vibration member is a metal material such as steel, the half wavelength is of the order of 60–150 mm and it is necessary that the vibration member itself have at least a length of this order. Further, the addition of structural parts for driving will result in considerable dimensions as a whole and thus, it becomes difficult to construct a compact vibration wave motor. Moreover, to revolve the vibration wave motor of this type in forward and reverse directions, a forward-reverse revolution device is necessary, and this also leads to structural complexity.

SUMMARY OF THE INVENTION

In view of the above-noted problems peculiar to the prior art, it is an object of the present invention to provide a vibration drive motor which utilizes a bending vibration wave in two directions, whereby the motor can be made simple in structure as well as compact and light in weight, and control of the speed and drive force is easy.

Other objects of the present invention will become apparent from the following detailed description of the invention.

BRIEF DESCRIPTION OF THE DRAWINGS

FIG. 7 is a perspective view of another embodiment of the present invention.

FIG. 8 shows the support position in the FIG. 7 embodiment.

DESCRIPTION OF THE PREFERRED EMBODIMENTS

Some embodiments of the present invention will hereinafter be described with reference to the drawings.

Figure 1:
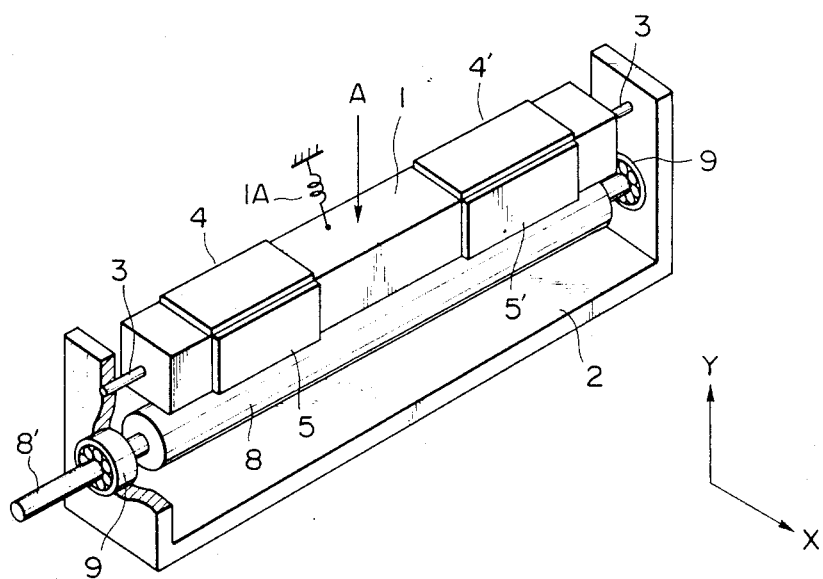
FIGS. 1 and 2 are a perspective view and a cross-sectional view, respectively, of an embodiment of the present invention.
Figure 2:
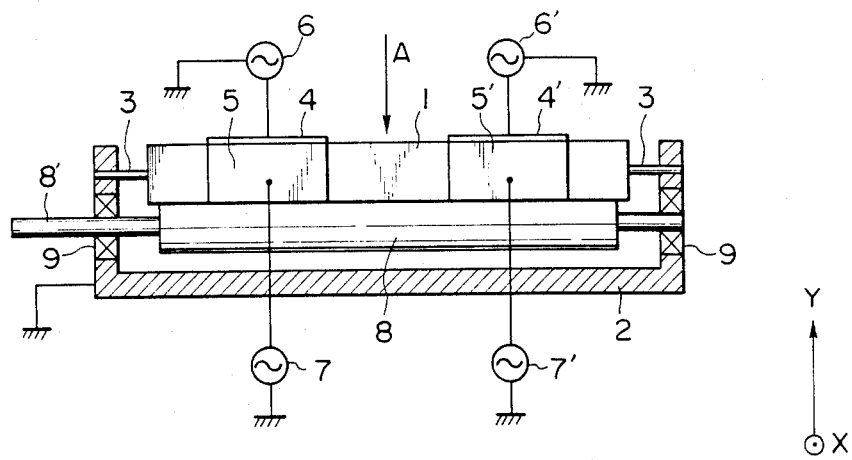

FIG. 1 is a perspective vie schematically showing the construction of a vibration drive motor according to an embodiment of the present invention, and FIG. 2 is a cross-sectional view thereof. In these figures, a bar-like vibration member 1 formed of an elastic material has its opposite ends supported on a support frame 2 by support members 3. The support members 3 are made of piano wire material or the like and can freely support the bar-like vibration member 1 without attenuating the vibration of the latter. In the present embodiment, the bar-like vibration member 1 and the support frame 2 are made of a metal. The bar-like vibration member 1 is made so that the cross-sectional shape thereof is point-symmetrical and that the natural frequency of the bending vibration in the X direction and the natural frequency of the bending vibration in the Y direction reaction are equal to each other. For this purpose, the bar-like vibration member 1 is made so that only the cross-sectional secondary moments in two orthogonal directions (X direction and Y direction) are equal to each other. In the present embodiment, the bar-like vibration member 1 has a square cross-section and the edge portions thereof are chamfered, and the cross-sectional secondary moments only in the X direction and the Y direction are made equal to each other.

Piezo-electric elements 4, 4' and 5, 5', as electro-mechanical energy converting elements, are joined to the upper surface and one side surface, respectively, of the bar-like vibration member 1. Electrodes are formed on the front and back surfaces of these piezo-electric elements 4, 4' and 5, 5' (that surface thereof which is joined to the bar-like vibration member 1 is the back surface, and the opposite surface is the front surface). One of these electrodes is connected to an end of known AC voltage applying means 6, 6', 7, 7' and the other electrode is grounded through an electrically conductive path passing through the bar-like vibration member 1, the support member 3 and the support frame 2. The other ends of the AC voltage applying means 6, 6', 7, 7' are also grounded, whereby a circuit for the application of an AC voltage to the piezo-electric elements 4, 4', 5, 5' is formed. These piezo-electric elements, when an AC voltage is applied thereto, expand and contract in a direction perpendicular to a plane X-Y in conformity with the phase thereof, and cause such bending vibration of the bar-like vibration member 1 that when they expand, that side of the bar-like vibration member which is adjacent to the piezo-electric elements becomes convex and when they contract, said size of the bar-like vibration member becomes concave.

The centers of the piezo-electric elements 4, 5 and 4', 5' are provided at the same positions with respect to the lengthwise direction of the bar-like vibration member 1, namely, at the positions of the loops of the intrinsic bending vibration of the bar-like vibration member 1.

Below the bar-like vibration member 1, there is a roller 8 rotatably held relative to the support frame 2 by bearings 9. The end shaft 8' of the roller 8 is used as an output shaft. There is an urging mechanism 1A on the upper surface of the bar-like vibration member 1. This urging mechanism can impart an urging force in the direction of arrow A to the bar-like vibration member 1, whereby the lower surface of the bar-like vibration member 1 is urged against the roller 8.

Figure 3:
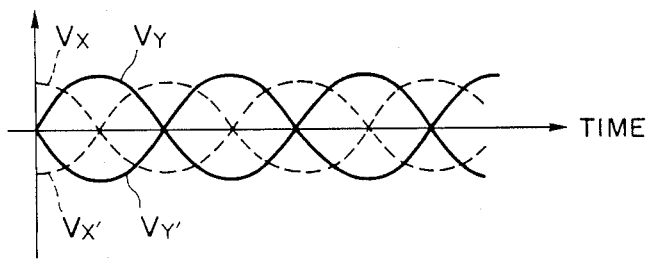
FIG. 3 shows an applied AC voltage in the same embodiment.
Figure 4:
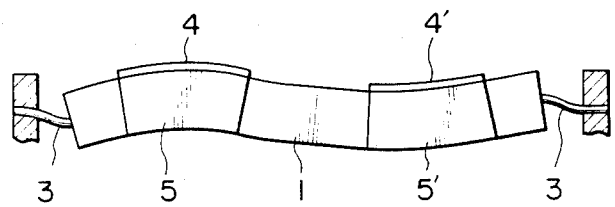
FIGS. 4 and 5 illustrate the principle of drive of the present invention.

The action of the present embodiment will now be described. When an AC voltage of a frequency $f_Y$ coinciding with the natural frequency of the bending vibration of the bar-like vibration member 1 in Y direction is applied by the voltage applying means 6 to the piezo-electric element 4 attached to the upper surface of the bar-like vibration member 1, a bending vibration in the direction is excited thereby in the bar-like vibration member 1. An AC voltage of the frequency $f_Y$ is also applied to the voltage applying means 6'. However, the voltage $V_Y$ applied to the piezoelectric element 4 and the voltage $V_Y'$ applied to the piezo-element electric element 4' are made to differ in phase by 180° as shown in FIG. 3. Thereby a steady bending vibration displaced is Y direction is realized in the bar-like vibration member 1. The vibration behavior of the bar-like vibration member 1 is shown in FIG. 4. The example of this figure shows the tertiary bending vibration mode in which the opposite ends are free, and the central portion thereof is one of the modes of the vibration.

In the same manner, an AC voltage $V_X$ of a frequency $f_X$ coinciding with the natural frequency of the bending vibration of the bar-like vibration member 1 in the X direction is applied by the voltage applying means 7 to the piezo-electric element 5 provided on one side surface of the bar-like vibration member 1, and an AC voltage $V_X'$ of the frequency $f_X$ 180° out of phase with the AC voltage $V_X$ as shown in FIG. 3 is also applied to the piezo-electric element 5' by the voltage applying means 7'. Thereby a steady bending vibration similar to that in Y direction is realized in X direction in the bar-like vibration member 1. As previously described, the bar-like vibration member is made so that the natural frequencies of the bending vibrations in the X direction and Y direction are equal to each other and accordingly, the frequencies $f_X$ and $f_Y$ of the applied AC voltages are equal to each other.

Figure 5:
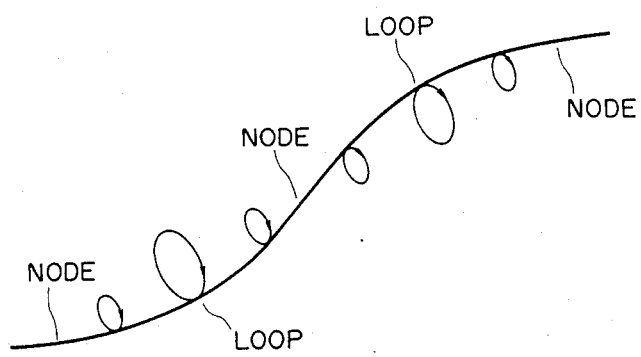

When AC voltages $V_Y$ and $V_Y'$ are applied to the piezo-electric elements 4 and 4' and at the same time, AC voltages $V_X$ and $V_X'$ are applied to the piezo-electric elements 5 and 5', and the phase difference therebetween is set to 90° as shown in FIG. 3, rotational vibration is generated in the bar-like vibration member 1. At this time, the behavior of the mass point on the surface of the bar-like vibration member 1 effects a small rotational movement as shown in FIG. 5. As shown in FIG. 5, the rotation radius of the rotational movement of this mass point on the surface becomes maximum in the loop portions of the vibration and becomes zero in the node portions of the vibration. If the magnitudes of the applied AC voltages $V_Y$, $V_Y'$ and $V_X$, $V_X'$ are made equal to each other, the rotational movement of the mass point on the surface of the bar-like vibration member 1 will be a circular movement, and if said magnitudes are made different from each other, said rotational movement will be an elliptical movement.

So, when the roller 8 is pressed against the lower surface of the bar-like vibration member 1, the roller 8 will be urged chiefly against the loop portions of the vibration of the bar-like vibration member 1 and will be given a frictional rotation drive force by the circular or elliptical movement of the mass point on the surface of the bar-like vibration member 1.

Here, the vibration which receives the urging force in the direction of arrow A is a vibration in the Y direction, and the vibration which obtains a rotational force is a vibration in the X direction, and therefore, it is necessary to control the amplitudes of the vibrations in the X and Y directions in obtaining a proper urging force, a proper rotational force and a proper rotational speed. In the embodiment of the present invention, the magnitudes of the applied voltages $V_X$, $V_X'$ and $Y_Y$, $V_Y$ can be changed independently of each other and thus, control of the vibration amplitudes is very easy.

Further, bending the vibration is used in the embodiment of the present invention and therefore, unlike the aforedescribed prior-art method using longitudinal vibration, the vibration is not determined by only the material constant of the bar-like vibration member 1, but also depends on the cross-sectional shape of the bar-like vibration member 1. Accordingly, when a small vibration drive motor is to be made, roughly speaking, the motor may be considered to be the bar-like vibration member 1 shortened similarly. Speaking on the principle, according to the present invention, it is also possible to provide a super-small vibration drive motor of the order of several millimeters. The change of the direction of rotation can be very simply accomplished by changing over the relative phase difference between the applied AC voltages $V_X$, $V_X'$ and $V_Y$, $V_Y'$ to either 90° or −90°.

In the above-described embodiment, the opposite ends of the bar-like vibration member 1 are freely supported, but instead, an embodiment in which said opposite ends are rigidly supported or joint-supported, or an embodiment in which one of said ends is cantilevered, is also possible.

Figure 6:
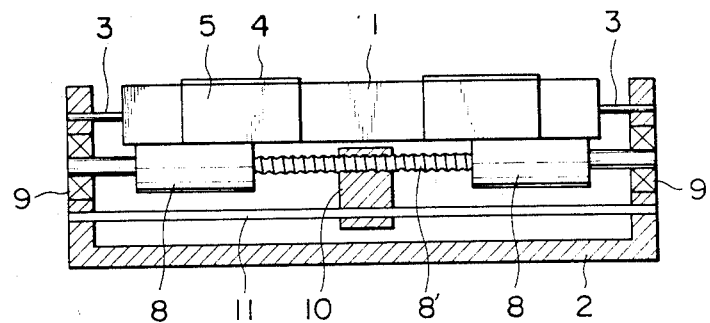
FIG. 6 is a cross-sectional view showing an embodiment of the present invention for obtaining a linear drive output.

The above-described embodiment is one in which the rotational drive force is output, and an embodiment in which a linear drive force is output is shown in FIG. 6. In FIG. 6, the central portion of the roller 8 is cut away and a screw portion 8' secured to the roller 8 is provided in the cut-away, and a mover 10 is threadably engaged with the screw portion 8'. A guide bar 11 is smoothly fitted to the lower portion of the mover 10, and the opposite ends of the guide bar 11 are fixed to the support frame 2. In the other points, the embodiment of FIG. 6 is entirely similar to the embodiment of FIGS. 1 and 2. When the roller 8 is rotated in the same manner as in the previously described embodiment, the screw portion 8' is also rotated, whereby the mover 10 is rectilinearly moved to the left and right, and this provides an output.

Another embodiment of the present invention is shown in FIG. 7. In this embodiment, the bar-like vibration member 1 is not supported by the support frame 2 but is made free, and the node positions of the vibration thereof are supported by a support member 12 (see FIG. 8), and a pressure force may be applied to the roller by the support member 12. The support member 12 also provides a stop for preventing rotation of the vibration bar 1. This embodiment is advantageous in that loss of vibration is small.

The present invention has the following effects:

(1) A compact, light-weight vibration drive motor is provided. In principle, even a super compact motor of the order of several millimeters can be provided.

(2) A motor in which control of the driving speed and drive force is easy can be provided.

(3) Forward and reverse rotations of the motor can be easily accomplished.

(4) Any of a motor of rotational drive and a motor of linear drive can be easily provided.

What is claimed is:

1. A vibration wave motor comprising:
 (a) a bar-like member;
 (b) means for supporting at least one end of said bar-like member;
 (c) an electro-mechanical energy converting element provided in at least two different planes in mutually perpendicular planes in the lengthwise direction of said bar-like member, rotational movement being generated in the surface of said bar-like member when an electrical signal is applied to said converting element;
 (d) a rotational member having an output shaft at one end thereof and rotatably supported; and
 (e) urging means for imparting an urging force between said bar-like member and said rotational member.

2. A vibration wave motor according to claim 1, wherein the rotational movement generated in the surface of said bar-like member is circular movement.

3. A vibration wave motor according to claim 1, wherein the rotational movement generated in the surface of said bar-like member is elliptical movement.

4. A vibration wave motor according to claim 1, wherein said bar-like member is a bar having a square cross-section.

5. A vibration wave motor according to claim 1, wherein said rotational member is formed by a roller.

6. A vibration wave motor according to claim 5, wherein the member for supporting said roller is a bearing rotatably supporting an output portion protruding from one end of said roller.

7. A vibration wave motor comprising:
 (a) a bar-like member;
 (b) means for supporting at least one end of said bar-like member;
 (c) an electro-mechanical energy converting element provided in at least two different planes in mutually perpendicular planes in the lengthwise direction of said bar-like member, rotational movement being generated in the surface of said bar-like member when an electrical signal is applied to said converting element;
 (d) a rotational member having a screw portion formed as an output shaft and rotatably supported;
 (e) urging means for imparting an urging force to between said bar-like member and said rotational member; and
 (f) a shiftable moving member having a portion threadably engaged with the screw portion of said rotational member.

8. A vibration wave motor comprising:
 (a) a bar-like member;
 (b) an electro-mechanical energy converting element provided in at least two different mutually perpendicular planes in the lengthwise direction of said bar-like member, rotational movement being generated in the surface of said bar-like member when an electrical signal is applied to said converting element;
 (c) rotatable means having an output shaft and arranged to be frictionally driven by a surface of said bar-like member; and
 (d) urging means for imparting an urging force between said bar-like member and said rotatable means.

9. A vibration wave motor comprising:
 (a) a bar-like member;
 (b) means for supporting at least one portion of said bar-like member;
 (c) a plurality of vibration elements mounted on said bar-like member for periodically bending said bar-like member in at least two directions normal to the longitudinal direction of said bar-like member, rotational movement being generated in the surface of said bar-like member when an electrical signal is applied to said vibration element; and
 (d) rotatable means having an output shaft and arranged to be frictionally driven by a surface of said bar-like member.

10. A vibration wave motor according to claim 8, wherein said supporting means is arranged to impart an urging force between said bar-like member and said rotatable means.

11. A vibration wave motor according to claim 8, wherein said supporting means supports a node position of said bar-like member.

* * * * *

UNITED STATES PATENT AND TRADEMARK OFFICE
CERTIFICATE OF CORRECTION

PATENT NO. : 4,857,793

DATED : August 15, 1989

INVENTOR(S) : Okuno

It is certified that error appears in the above-identified patent and that said Letters Patent is hereby corrected as shown below:

COLUMN 2:

Line 34, "vie" should read --view--.

Line 49, "directionreac-" should read --direction--.

Line 50, delete "tion".

COLUMN 3:

Line 14, "size" should read --side--.

Line 37, before "direction" insert --Y--.

Line 49, "modes" should read --nodes--.

COLUMN 4:

Line 33, "$Y_y, V_y$" should read --$V_y, V_y'$--.

UNITED STATES PATENT AND TRADEMARK OFFICE
CERTIFICATE OF CORRECTION

PATENT NO. : 4,857,793

DATED : August 15, 1989

INVENTOR(S) : Okuno

It is certified that error appears in the above-identified patent and that said Letters Patent is hereby corrected as shown below:

COLUMN 4:

Line 36, "bending the vibration" should read --the bending vibration--.

Signed and Sealed this

Twenty-fourth Day of July, 1990

Attest:

HARRY F. MANBECK, JR.

Attesting Officer

Commissioner of Patents and Trademarks